United States Patent Office 3,403,276
Patented Sept. 24, 1968

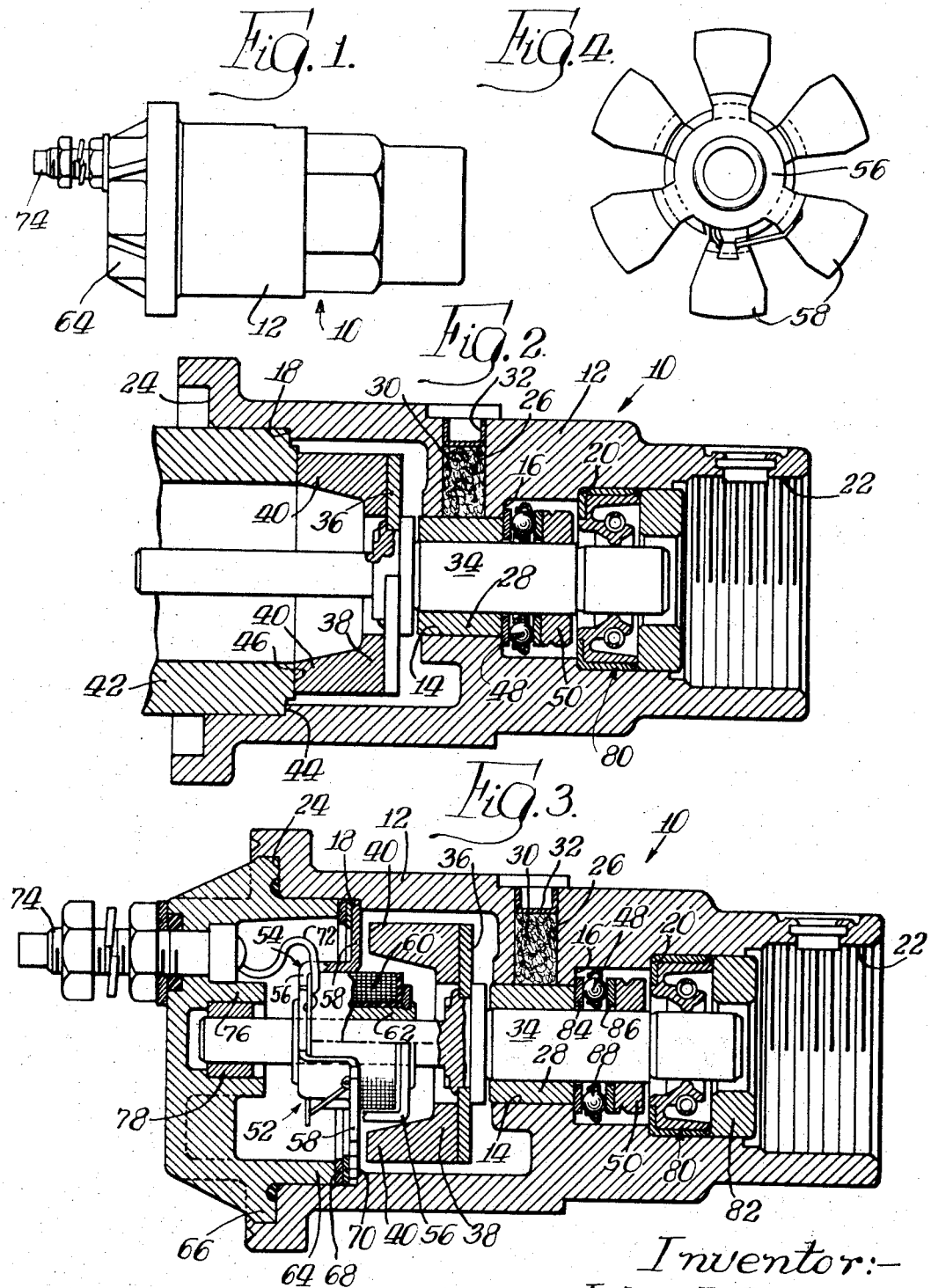

3,403,276
ELECTRICAL TACHOMETER SENDER
John D. Baker, Jr., Oak Park, Ill., assignor to Stewart-Warner Corporation, Chicago, Ill., a corporation of Virginia
Filed Feb. 28, 1966, Ser. No. 530,679
10 Claims. (Cl. 310—156)

The present invention relates generally to an electrical tachometer sender and more particularly to a sender incorporating novel means for properly locating the components thereof together with an improved bearing structure.

In general, an electrical tachometer sender of the type described herein is shown in Patent No. 3,156,839 and comprises an elongated casing, a stator unit mounted in the casing adjacent the forward end thereof, a magnet shaft rotatably mounted in the casing, and a magnet secured to the magnet shaft rearwardly of the stator unit. The magnet shaft is adapted to be mechanically connected to a rotating device such as an engine, while the stator unit is electrically connected to a tachometer receiver or indicator. As the magnet revolves with the magnet shaft, an electric current is generated in the stator unit. The current thus generated is transmitted to the tachometer receiver which controls a speed-indicating pointer. The electrical output of the tachometer sender is a function of both the rotational speed of the magnet shaft and the axial distance, or air gap, between the magnet and the stator unit.

It is an object of the present invention to provide an electrical tachometer sender, of the general type described, wherein a collar member is secured to the magnet shaft rearwardly of the magnet and is restrained against movement in an axial forward direction whereby a predetermined constant axial spacing is maintained between the magnet and the stator unit during operation of the sender.

It is another object of the present invention to provide an electrical tachometer sender, as described, wherein the casing is formed with first shoulder means intermediate of the ends thereof for restraining the collar member against movement in an axial forward direction.

It is another object of the present invention to provide an electrical tachometer sender, as described, wherein the casing is formed with second shoulder means adjacent the forward end thereof which initially serves as a reference plane in axially locating the magnet while the collar member is secured in position on the magnet shaft, and which thereafter serves as a seat for the stator unit.

It is a further object of the present invention to provide an improved bearing structure for a magnet shaft of the type described in the aforementioned patent.

Now in order to acquaint those skilled in the art with the manner of constructing and using electrical tachometer senders incorporating the principles of the present invention, there will be described in connection with the accompanying drawing a preferred embodiment of the invention.

In the drawing:

FIGURE 1 is a side elevational view of an electrical tachometer sender incorporating the principles of the present invention;

FIGURE 2 is a lengthwise median sectional view, on an enlarged scale, of the electrical tachometer sender of FIGURE 1 at an intermediate stage of assembly with a fixture positioned in the forward end thereof;

FIGURE 3 is a lengthwise median sectional view, on an enlarged scale, of the completely assembled electrical tachometer sender of FIGURE 1; and FIGURE 4 is an end elevational view of the stator unit shown in FIGURE 3.

Referring now to the drawing, there is indicated generally by the reference numeral 10 an electrical tachometer sender incorporating the principles of the present invention. The tachometer 10 comprises an elongated casing 12 which is formed interiorly with a central axial bore 14, a rearwardly facing first annular shoulder 16 intermediate of the ends thereof, and a forwardly facing second annular shoulder 18 adjacent the forward end thereof. The casing 12 is also formed interiorly with a rearwardly facing third annular shoulder 20 rearwardly of the shoulder 16, threads 22 at the rearward end thereof, and a forwardly facing fourth annular shoulder 24 at the forward end thereof. Additionally, a radial opening 26 is formed in the casing 12 and communicates with the central axial bore 14.

Secured in the bore 14 is an oilite bearing 28, and disposed in the radial opening 26 is an oil wick 30 that is maintained in place by a cover plug 32. Rotatably mounted in the bearing 28 is a magnet shaft 34. A pole piece ring 36, and a magnet 38 having axially forwardly extending pole portions 40, are secured to the magnet shaft 34 forwardly of the bearing 28.

During assembly of the tachometer sender 10, a fixture 42 is disposed in the forward end of the casing 12 as shown in FIGURE 2. The inner end of the fixture 42 has an annular shoulder 44 that engages the casing shoulder 18, and an axially offset face 46. At this time, a thrust bearing assembly 48 and a thrust collar member 50 are placed over the rearward end of the magnet shaft 34. While the forward ends of the magnet pole portions 40 are maintained in engagement with the fixture face 46, the collar member 50 is moved axially forwardly on the magnet shaft until the thrust bearing assembly 48 is seated against the casing shoulder 16. The collar member 50, which is press-fitted or otherwise secured on the magnet shaft 34, thus serves to axially locate the magnet 38 in accordance with the principles of the present invention and as will be explained more fully hereinafter. After the collar member 50 has been properly positioned, the fixture 42 is removed from the casing 12.

Then, a stator unit 52 is disposed in the forward end of the casing 12 as shown in FIGURE 3. The stator unit 52 comprises a field cage 54 which includes a pair of plate members 56 having axially offset alternately arranged radial arm portions 58 as shown in FIGURE 4. The arm portions 58, which lie in the same plane, serve to define median radial flange means that is seated against the casing shoulder 18. The field cage 54 has axially arranged therein coil means 60. The two plate members 56 of the field cage 54 and the coil means 60 are maintained in assembled relation by means of tubular bushing 62 which is suitably peened or rolled over at its opposite ends.

A plastic cap member 64 is staked in the forward end of the casing 12, and is provided with an annular flange portion 66 that is engaged with the casing shoulder 24. Also, a first readily deformable ring 68, for example, of Teflon, and a second ring 70 of a temperature compensating magnetic alloy, are interposed between the inner end of the cap member 64 and the arm portions 58 of the field cage 54. By reason of this construction, the stator unit 52 is axially located within the casing 12 with the arm portions or flange means 58 of the field cage 54 firmly abutting the casing shoulder 18. When the stator unit 52 is thus positioned as shown in FIGURE 3, the magnet pole portions 40 surround a portion of the field cage 54 and the coil means 60.

The coil means 60 of the stator unit 52 at one side is grounded and at the other side is connected by a wire 72 to a terminal 74 extending through the cap member 64. The terminal 74 is adapted to be connected by a cable or wire to an electrical tachometer receiver or indicator (not shown). The cap member 64 also has an axial sleeve portion 76 in which is secured a bearing 78. The forward end of the magnet shaft 34 is rotatably supported in the bearing 78. Surrounding the rear end of the magnet shaft 34 is an oil seal unit 80 that abuts the casing shoulder 20, and a stop collar 82 press-fitted into the casing 12. The rear end of the casing 12 is connected by the threads 22 to the stationary member of a mechanical drive unit such as an engine or transmission, while the rear end of the magnet shaft 34 is formed with an axial socket that receives a rotatable member transmitting movement from the mechanical drive unit.

During rotation of the magnet 38 with the magnet shaft 34, an electric current is generated in the stator unit 52. This current is transmitted to the tachometer receiver that controls a speed-indicating pointer where the speed of the drive unit is registered. The electrical output of the tachometer sender 10 is a function of the speed of the input, i.e., the speed at which the magnet shaft 34 is rotated. The electrical output is also a function, in general of the axial distance between the magnet 38 and the stator unit 52, and more specifically of the axial distance, or air gap, between the ends of the magnet pole portions 40 and the arm portions or flange means 58 of the field cage 54. Since the magnet 38 is attracted toward the stator unit 52, and because the collar member 50 is restrained against movement in an axial forward direction by the casing shoulder 16 and the thrust bearing assembly 48, a constant air gap is maintained between the magnet and the stator unit during operation of the sender. This air gap in predetermined or preset by the fixture 42 and the cooperating casing shoulder 18 while the collar member 50 is secured in position on the magnet shaft 34. In this connection, the casing shoulder 18 initially serves as a reference plane, and the collar member 50 serves to axially locate the forward face of the magnet relative to this reference plane.

It will be noted that the sealing unit 80 bears against the shoulder 20 to provide a substantial sealing area, while the bearing assembly 48, which includes a pair of hardened steel washers 84 and 86 with a series of balls 88 therebetween, is engageable with the shoulder 16 to provide a substantial load bearing assembly for the shaft 34. The described arrangement of establishing and maintaining the desired operating air gap compensates or variations in size of the various piece parts, and the bearing construction minimizes wear of the parts.

While there has been shown and described a preferred embodiment of the present invention, it will be understood by those skilled in the art that various rearrangements and modifications may be made therein without departing from the spirit and scope of the invention.

I claim:

1. In an electrical tachometer sender, an elongated casing, a stator unit mounted in said casing adjacent the forward end thereof, a magnet shaft rotatably mounted in said casing, a magnet secured to said magnet shaft rearwardly of said stator unit, a collar member secured to said magnet shaft rearwardly of said magnet and being restrained against movement in an axial forward direction whereby a predetermined axial spacing is maintained between said magnet and said stator unit during operation of said sender.

2. The electrical tachometer sender of claim 1 wherein said casing is formed interiorly with a rearwardly facing first annular shoulder intermediate of the ends thereof, said magnet shaft is surrounded by a thrust bearing assembly that seat against said first shoulder, and said collar member engages said thrust bearing assembly thereby being restrained against movement in an axial forward direction.

3. The electrical tachometer sender of claim 2 wherein said thrust bearing assembly comprises a pair of washers with a series of balls therebetween.

4. The electrical tachometer sender of claim 2 wherein said casing is formed interiorly with a forwardly facing second annular shoulder adjacent the forward end thereof, said stator unit is seated against said second shoulder, and said collar member serves to axially locate the forward face of said magnet relative to the plane of said second shoulder whereby a predetermined operating air gap is maintained between the forward face of said magnet and the adjacent portion of said stator unit.

5. The electrical tachometer sender of claim 4 wherein said casing is formed interiorly with a rearwardly facing third annular shoulder rearwardly of said first shoulder, and including a sealing unit surrounding said magnet shaft and seated against said third shoulder.

6. The electrical tachometer sender of claim 4 wherein said stator unit includes a field cage having axially disposed coil means therein and having median radial flange means seated against said second shoulder, said magnet includes axially forwardly extending pole portions that surround a portion of said field cage and coil means, and said collar member serves to axially locate the forward ends of said magnet pole portions relative to said radial flange means of said field cage whereby a predetermined operating air gap is maintained therebetween.

7. The electrical tachometer sender of claim 6 including a cap member at the forward end of said casing for maintaining said radial flange means of said field cage in seating engagement with said second shoulder, and wherein said magnet shaft extends through said stator unit and is rotatably supported at its forward end in said cap member.

8. In an electrical tachometer sender, an elongated casing, a magnet shaft rotatably mounted in said casing, a magnet secured to said magnet shaft intermediate of the ends thereof, said casing being formed interiorly with a rearwardly facing first annular shoulder rearwardly of said magnet, a thrust bearing assembly surrounding said magnet shaft and being seated against said first shoulder, and a collar member secured to said magnet shaft and engaging said thrust bearing assembly whereby said magnet shaft is restrained against movement in an axial forward direction.

9. The electrical tachometer sender of claim 8 wherein said thrust bearing assembly comprises a pair of washers with a series of balls therebetween.

10. The electrical tachometer sender of claim 8 wherein said casing is formed interiorly with another rearwardly facing annular shoulder rearwardly of said first shoulder, and including a sealing unit surrounding said magnet shaft and seated against said another shoulder.

References Cited

UNITED STATES PATENTS

| | | | |
|---|---|---|---|
| 2,698,396 | 12/1954 | Stokmans | 310—156 |
| 3,150,278 | 9/1964 | Clark | 310—156 |
| 3,156,839 | 11/1964 | Wargo | 310—156 |

MILTON O. HIRSHFIELD, *Primary Examiner.*

L. L. SMITH, *Assistant Examiner.*